United States Patent Office 2,906,658
Patented Sept. 29, 1959

2,906,658

METHOD FOR THE PREPARATION OF CEMENT-ABLE FLUOROCARBON POLYMER SURFACES

Robert Charles Doban, Wilmington, Del., assignor to E. I. du Pont de Nemours and Company, Wilmington, Del., a corporation of Delaware No Drawing. Application February 5, 1958
Serial No. 713,299

4 Claims. (Cl. 154—139)

The present invention relates to a novel method for making surfaces of fluorinated polymers cementable.

Polymers of fluorinated olefins, such as polytetrafluoroethylene, polychlorotrifluoroethylene and copolymers of tetrafluoroethylene with fluorinated olefins, are highly useful dielectric materials which find wide applications in the electric and electronic industry. In addition to their electrical properties the fluorinated polymers show outstanding corrosion resistance to many chemicals. Another property of the fluorinated polymers and particularly polytetrafluoroethylene, is the extremely low adhesion of the polymer surface to other materials. This property is a disadvantage in the preparation of articles requiring the bonding of the polymer surface to itself or to other surfaces. Adhesives generally used in cementing polymers do not give satisfactory results when employed with fluoroolefin polymers. The cementing of fluoroolefin polymers to other surfaces is highly desirable in the lining of steel pipes and vessels used in the storage and transportation of corrosive chemicals, since the corrosion resistant polymers can then be combined with less expensive structural materials. Another large application for cementable fluoroolefin polymers is in the manufacture of pressure-sensitive insulation tapes.

Polytetrafluoroethylene and related polymers can be laminated to metal surfaces at elevated temperatures and pressures. Thus it is possible to bond layers of polytetrafluoroethylene to layers of copper by heating a laminate of the two at temperatures of 350° C. to 400° C. under pressure for periods of 30 minutes and cooling the resulting laminate. Similarly, a layer of aluminum which has been treated with chromic acid can be bonded to a polytetrafluoroethylene surface by heating the polymer and the aluminum at temperatures above the crystalline melting point of the polymer under pressure. It had also been known heretofore that polytetrafluoroethylene could be bonded to itself employing an aqueous colloidal dispersion of polytetrafluoroethylene (e.g. U.S. 2,484,484). But again the bonding is achieved by heating the surfaces to be bonded to a temperature above 325° C. and below the decomposition temperature of the polymer. The need for these high temperatures makes these bonding processes of limited utility. Thus all of these processes require bonding temperatures above 327° C. These temperatures are only obtained with great difficulty when the process is to be carried out in the field or where the substrate is metallic in nature and is in the form of a large sheet or long tube. Heat conductivity of the metal may be such that heating the piece to 327° C. is exceedingly expensive and uneconomic. Furthermore, the high temperatures necessary may deform the polytetrafluoroethylene article to be bonded to a substrate. The use of substrates is, in addition, limited to such as are capable of withstanding the elevated temperatures necessary to obtain bonding. The processes requiring pressure may furthermore be limited in the practical difficulty of applying the pressure to the shapes to be bonded.

Recently however, a technique for bonding polytetrafluoroethylene was developed (i.e. U.S. 2,789,063) which allows the bonding of polytetrafluoroethylene surfaces at temperatures below the melting point of the polymer with adhesives which are normally useful for bonding of solid materials. This process involves the treatment of the polytetrafluoroethylene surface to be bonded with a solution of an alkali metal in a solvent such as liquid ammonia. The surface of the polymer becomes modified and as a result thereof, is cementable. This process, however, has the disadvantage that the cementable surface is decomposed by photooxidation and is thus not weather resistant.

It is therefore an object of the present invention to provide a method for making surfaces of polytetrafluoroethylene cementable. It is another object of the present invention to provide a method for cementing polytetrafluoroethylene which is highly resistant to weathering. Still another object of the present invention is to provide a bonding process employing low bonding temperatures. Other objects will become apparent hereinafter.

The objects of the present invention are accomplished by a method which comprises coating the surface with a codispersion of colloidal fluorocarbon resin such as polytetrafluoroethylene and colloidal silica and thereafter heating the coated surface to a temperature of 500 to 550° C. for a period of 0.5 to 5 minutes and recovering a modified cementable polytetrafluoroethylene surface. The use of codispersions of polytetrafluoroethylene and silica as a coating composition for metals has been known heretofore (U.S. Patent 2,592,147). The coating composition must, however, be heated to above 327° C. to obtain bonding. The bond is said to be obtained as a result of an interaction between the metals and the components of the coating mixture. The process of the present invention, however, is based on the discovery that the surface of polytetrafluoroethylene can be modified by treating it with a codispersion of polytetrafluoroethylene and silica and thereafter heating the coated surface to a temperature of 500 to 550° C. The resulting surface was found to be cementable to any other surface, and particularly to metal surfaces employing any commercially available adhesive. Consequently, the bonding processes suitable for the surfaces prepared by the process of the present invention are not limited to a polytetrafluoroethylene containing bonding agents, nor are they limited to the high temperatures employed in many of the bonding processes known theretofore.

The coating composition employed to modify the surface of the polytetrafluoroethylene to be made cementable is a codispersion of a fluorocarbon resin, preferable polytetrafluoroethylene, and silica. A polytetrafluoroethylene coating composition is suitably prepared by admixing aqueous dispersions of colloidal polytetrafluoroethylene and silica. The codispersions may be prepared by the methods disclosed in U.S. 2,592,147. Suitable, aqueous dispersions of polytetrafluoroethylene containing from 30 to 60% by weight of the total composition of polytetrafluoroethylene, commercially available under the tradename "Teflon," are admixed with aqueous dispersions of colloidal silica containing 30% by weight of the composition of silica. It is, however, quite possible to employ colloidal dispersions of polytetrafluoroethylene and colloidal silica of more dilute or more concentrated quantities. The two dispersions should be combined with such agitation as will result in a homogeneous mixture. The quantity of silica employed in relation to the polytetrafluoroethylene is critical with respect to obtaining optimum bond strength and should not exceed 20 weight percent of the colloidal polytetrafluoroethylene and should be at least 5 weight percent of the colloidal polytetrafluoroethylene.

The resulting codispersion can be applied to the polytetrafluoroethylene surface to be treated by brushing, spraying or dipping. The application of the coating should be such that an even deposition of the solid is obtained. Such a coating is generally obtained if it is possible to remove the diluent as soon as the coating composition comes in contact with the surface. It is therefore preferred to spray aqueous codispersion onto a surface which has been preheated to a temperature of 200 to 300° C.; such a technique causes evaporation of the diluent on contact and leaves a coherent film of the dispersed solid. The coating applied should not exceed one mil in thickness to obtain optimum results, although coatings thicker than one mil will result in a measure of adhesion.

The surface to be coated should be thoroughly cleaned prior to applying the coating. If desirable, the surface may also be roughened. The process of the present invention is applicable to both sintered and unsintered surfaces of polytetrafluoroethylene.

The coated surfaces are heat-treated at temperatures of 500° C. to 550° C. for a period of 0.1 to 5 minutes. The heat-treating step is highly critical in the process of the present invention. The temperatures employed are above the sintering temperatures generally employed for polytetrafluoroethylene and result in some decomposition of the polymer. Although the behavior of the silica and polytetrafluoroethylene at these temperatures is not clearly understood, it is quite possible that the decomposition of polytetrafluoroethylene in the presence of the silica is necessary to achieve the desired cementable surface. The temperature however, can not be maintained for extended periods of time since such exposure rapidly decreases the adhesive properties of the surface treated. In general, exposure times should not be extended beyond 5 minutes at temperatures of 500° C.

Although silica and silica gels can be adhered to fluorocarbon polymer surfaces by coating the surface with dispersions of silica or organosols of silica and then heating the coated surface to just above the melting point, such surfaces do not become cementable but merely make the polymer wettable.

The resulting polytetrafluoroethylene surface can be bonded to metal, glass, wood and other surfaces employing polyester, cellulosic, and silicone resin adhesives. In bonding the treated surface to itself or other surfaces, no special techniques need be employed except such as are generally employed with the adhesives used.

The following example further illustrates the process of the present invention.

EXAMPLE

To 100 ml. of an aqueous polytetrafluoroethylene dispersion containing 60% of polytetrafluoroethylene, commercially available as "Teflon" 30, was added 40 ml. of an aqueous dispersion of silica, commercially available as "Ludox," which contains 30% of colloidally dispersed silicon dioxide. The resulting mixture was stirred until homogeneous.

A polytetrafluoroethylene film 10 mil. thick was placed against a hot plate and heated to a temperature of 250° C. The codispersion was then sprayed by means of an air brush, held 6-8 in. from the surface, onto the heated polytetrafluoroethylene surface employing a pressure of about 10 p.s.i. Approximately 0.3 ml./sq. in. was applied to the surface which became dry immediately on contact. The polytetrafluoroethylene film was then placed into an oven maintained at 500° C. and removed after 5 minutes of exposure.

The resulting treated film was cut into strips and bonded to copper bars employing an epoxy resin bonding agent, commercially available as R-313. A coat of the resin was applied to the modified polytetrafluoroethylene surface and the copper bar. The coated surfaces were pressed together and heated to 100° C. under a pressure of 50 p.s.i. for 30 minutes to effect the curing.

In addition to the epoxy resin, some of the film samples were bonded to copper employing a silicone resin adhesive commercially available as "Silicone" C-269. The treated polytetrafluoroethylene surface and the copper bar were coated with the silicone resin, and were then exposed in a circulating air oven at 100° C. until the resin became tacky; the surfaces were then pressed together at 50 p.s.i. and heated at 185° C. for 5 minutes.

The bonded samples were tested for peel strength and for shear strength. The peel strength was determined by measuring the force per inch of bonded surface necessary to peel the polymer back on itself. The shear strength was measured by preparing bonded samples having a 1" overlap and pulling the sample at opposite ends in an "Instron" tester at a rate of 2 in./min., and measuring the force required to break the bond.

The table below shows the results obtained with the above procedure employing in addition to silica other additives or no additives in the coating composition.

Table I

| Additive | Heat-treatment temperature, °C. | Heat-treatment time, min. | Adhesive | Peel strength in lbs./in. | Shear strength in lbs./in. |
| --- | --- | --- | --- | --- | --- |
| Colloidal silica | 500 | 5 | Epoxy resin R-313 | 2.5 | 19 |
| Do | 500 | 10 | do | 1.0 | |
| Do | 350 | 5 | do | 0.5 | |
| Do | 350 | 30 | do | 0.3 | |
| Do | 500 | 5 | Silicone resin C-268 | 3.5 | 20 |
| None | 500 | 5 | Epoxy resin R-313 | 0.1 | |
| Calcium fluoride | 500 | 5 | do | 2.5 | |

The foregoing example demonstrates the process of the present invention in one of its particular embodiments. It should be noted that other surfaces such as aluminum, steel, wood, plastic, asbestos and ceramics may similarly be bonded to the treated polytetrafluoroethylene surface of the present invention. The foregoing example furthermore illustrates that in addition to silica, calcium fluoride is a useful additive creating a cementable surface and that the presence of the additive is essential in obtaining strong bonds between the substrate and the polytetrafluoroethylene to be bonded. The use of the dispersion alone without an additive gives rise, as shown by the example, to exceedingly weak bonds when employed in the process of the present invention.

The treated surface of the present invention in contrast to some of the prior art processes is exceedingly weather resistant. Bonded samples made by the process of the present invention have been exposed for over 250 hours in the Weather-O-Meter with no change in peel strength. Although the process of the present invention employs high temperatures, to obtain the cementable surface, the treating step is separated from the bonding step and can thus be carried out during the fabrication of the polytetrafluoroethylene article where such temperatures can be readily attached. Thus in contrast to some of the prior art methods, the bonding step does not require high temperatures and can readily be carried out on a large scale and in the field.

Although the process of the present invention has been primarily described with respect to the use of polytetrafluoroethylene in combination with colloidal silica as the surface treating agent, it is to be understood that equally good bonding results are obtained by the use of any fluorocarbon resin, i.e., resins comprising primarily carbon and fluorine, when employed in colloidal form. Such fluorocarbon resins include, in addition to polytetrafluoroethylene, copolymers of tetrafluoroethylene with comonomers such as hexafluoropropylene, perfluorobutene-1, perfluorohexene-1, nonafluoropentene, perfluoroheptene-1, and heptafluorobutene-1. The shape of the surface is in no way critical to the successful operation of the process. Thus it is feasible to use the process for films, complex shaped articles, fibers, woven fabrics, unwoven fabrics, etc. In addition, the process may be used to coat sintered as well as unsintered polytetrafluoroethylene substrates. The process is, furthermore, readily carried out in a continuous manner.

I claim:

1. A process for making a polytetrafluoroethylene surface cementable which comprises coating said surface with a codispersion of a colloidal fluorocarbon resin and colloidal silica, the ratio of said fluorocarbon resin to said silica being from 5:1 to 20:1, and thereafter heating the coated surface to a temperature of 500 to 550° C. for a period of 0.1 to 5 minutes.

2. A process for making a polytetrafluoroethylene surface cementable which comprises coating said surface with an aqueous codispersion of colloidal polytetrafluoroethylene and colloidal silica, the ratio of said polytetrafluoroethylene to said silica being from 5:1 to 20:1 and thereafter heating the coated surface to a temperature of 500 to 550° C. for a period of 0.1 to 5 minutes.

3. The process of claim 2 wherein the surface to be coated is preheated to a temperature of 200 to 300° C.

4. The process of bonding polytetrafluoroethylene to another surface which comprises coating a surface of polytetrafluoroethylene maintained at a temperature of 200 to 300° C. with an aqueous codispersion of colloidal polytetrafluoroethylene and colloidal silica in a ratio of 10:1, thereafter heating the said coated surface to a temperature of 500 to 550° C. for a period of 0.1 to 5 minutes and thereafter bonding said surface to another surface with an adhesive.

References Cited in the file of this patent

UNITED STATES PATENTS

| | | |
|---|---|---|
| 2,592,147 | Ikeda | Apr. 8, 1952 |
| 2,764,506 | Piccard | Sept. 25, 1956 |